Nov. 29, 1949          P. BRIKOFF          2,489,614
                      FISHING LINE REEL

Filed Oct. 25, 1946                    2 Sheets-Sheet 1

Inventor
Phillip Brikoff

Nov. 29, 1949   P. BRIKOFF   2,489,614
FISHING LINE REEL
Filed Oct. 25, 1946   2 Sheets-Sheet 2

Inventor
Phillip Brikoff

By McMorrow, Berman & Davidson
Attorneys

Patented Nov. 29, 1949

2,489,614

UNITED STATES PATENT OFFICE 2,489,614

FISHING LINE REEL

Phillip Brikoff, Seattle, Wash.

Application October 25, 1946, Serial No. 705,542

2 Claims. (Cl. 242—84.5)

My invention relates to a fishing line reel.

An important object of the invention is to provide a reel of extremely simplified construction, yet one which will perform the functions of much more complicated and expensive reels.

A still further object is to provide a fishing line reel, the use of which makes it extremely unlikely that sudden and strong pulling of the line will break the same.

Other important objects and advantages of my invention will be apparent during the course of the following description.

Figure 1:
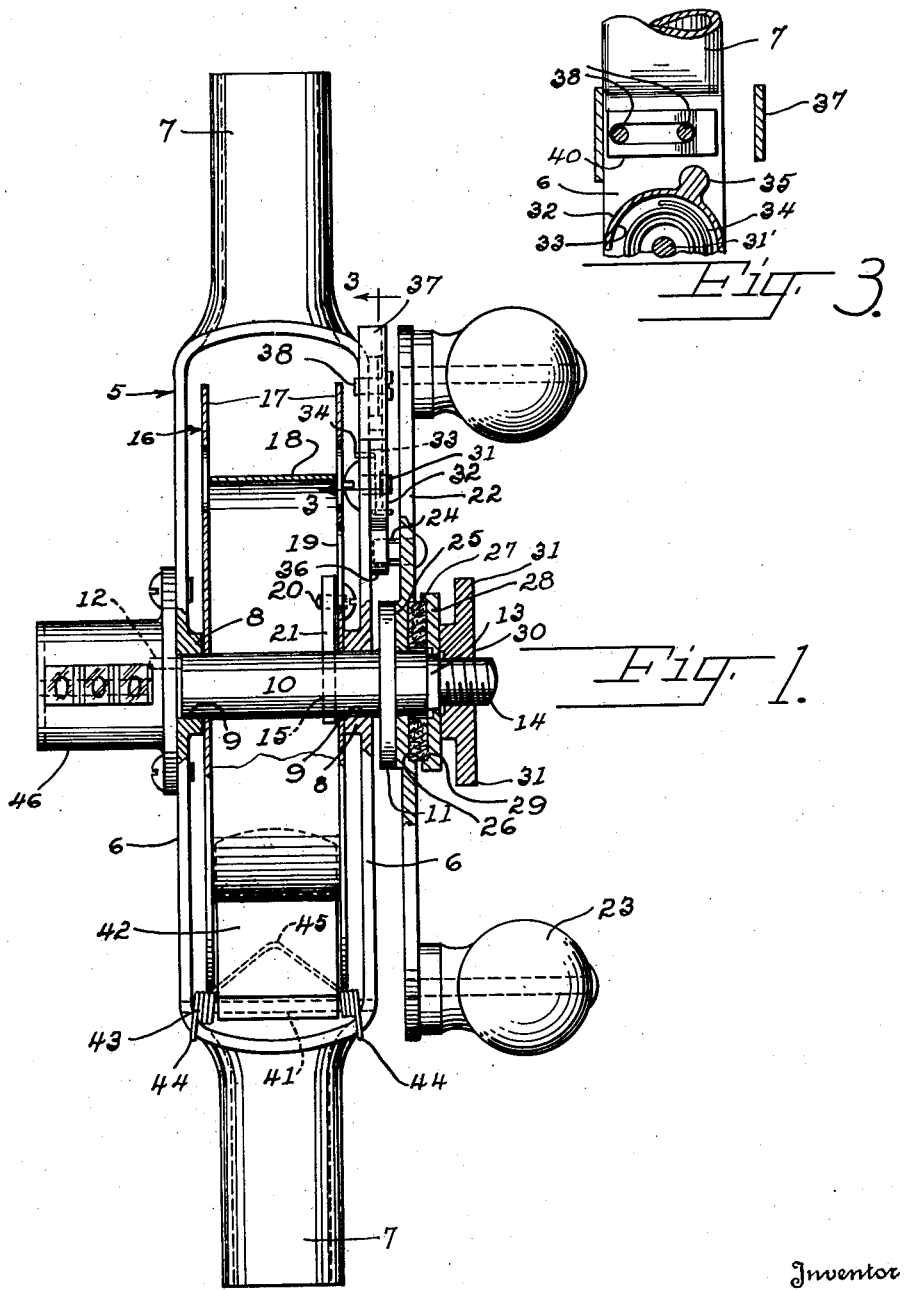
Figure 2:
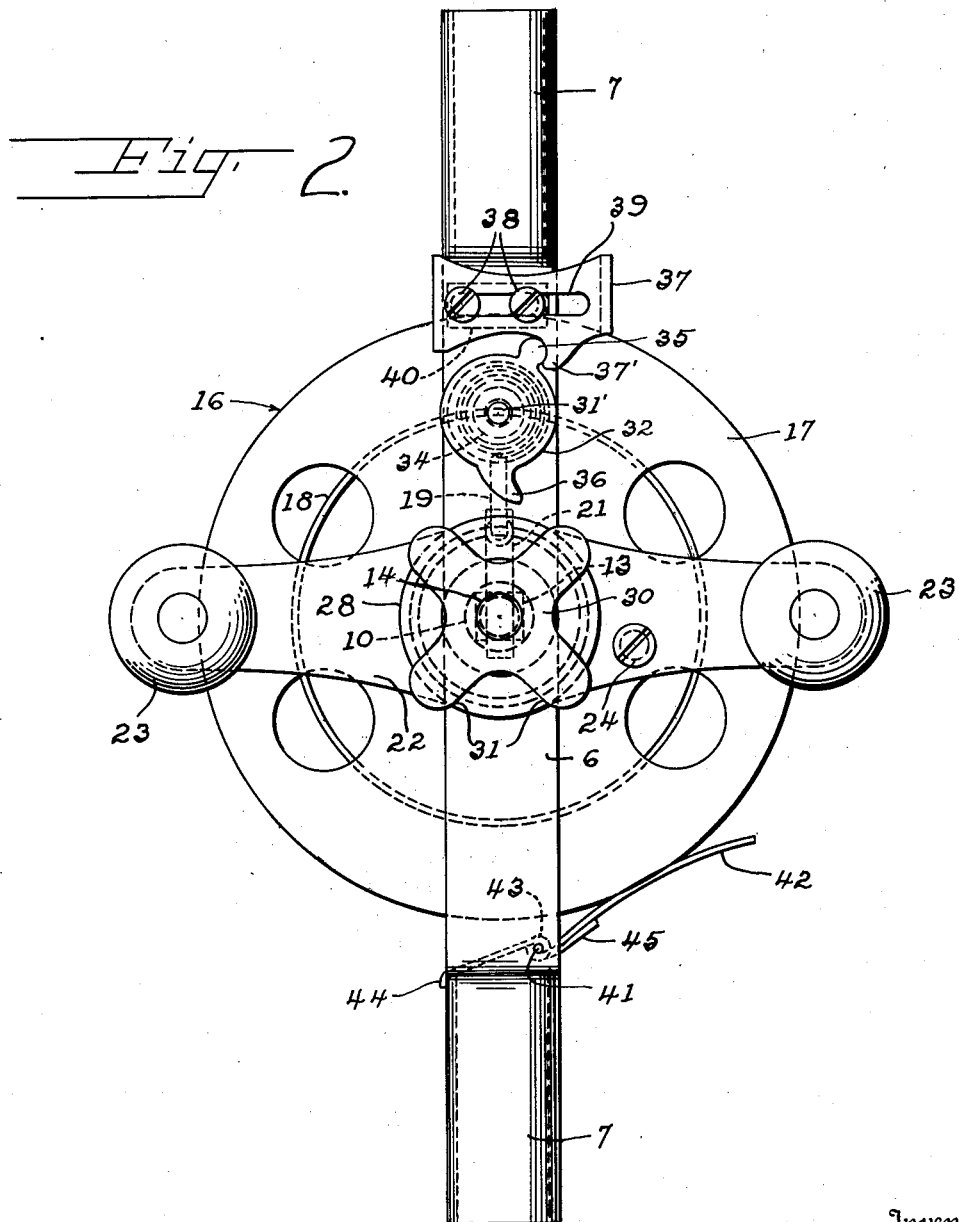

In the accompanying drawings, forming a part of this application, and in which like numerals are employed to designate like parts throughout the same, Figure 1 is an edge elevation of the fishing line reel embodying my invention, parts in section, Figure 2 is a side elevation of the reel, showing the crank at right angles to its position shown in Figure 1, and, Figure 3 is a fragmentary detail section taken on line 3—3 of Figure 1.

In the drawings, where for the purpose of illustration, is shown a preferred embodiment of my invention, the numeral 5 designates a reel frame or yoke, including spaced parallel flat sides 6, the opposite ends of which converge and join to form longitudinally aligned tubular extensions or sockets 7. The sides 6 have central inwardly extending shoulders or hubs 8, having central openings 9, which are in axial alignment.

Rotatably mounted within the aligned openings 9, is a reel shaft 10, including a transverse circular shoulder 11 near one end, and a small longitudinal extension or lug 12 at the opposite end. The shaft 10 is further provided with a squared portion or extension 13, having a screw threaded extension or end 14. Formed in the shaft 10, near its longitudinal center, is a transverse opening 15, extending through the shaft.

Arranged for rotation between the parallel sides 6 of the yoke 5, and mounted upon the shaft 10, is a line reel or spool 16, including circular side discs 17, and a circular drum portion 18. A suitable fishing line, preferably formed of non-corrosive steel wire is wound upon the spool in use, but this line is not shown in the drawings. One side disc 17 has a radial slot 19, for receiving a suitable screw 20, having screw threaded engagement within a locking dog 21, received by the opening 15 in the shaft 10. The dog 21 thus locks or keys the spool 16 upon the shaft 10, for rotation with the shaft, and the spool is also held against axial movement upon the shaft by the dog 21. As shown clearly in Figure 1 of the drawings, the side discs 17 are arranged for rotation between the hubs 8, and the clearance between the hubs and discs is small. The shaft 10 and the reel or spool 16, as an assembly, are thus held against axial movement within the yoke 5.

Mounted upon the shaft 10, near the screw threaded end of the shaft, and adapted for rotation upon the shaft, is an elongated flat reel crank 22, carrying two handles or knobs 23, at its opposite ends, and being provided with a short transverse inwardly extending stop lug or pin 24, for a purpose to be described. The crank 22 has a central inwardly projecting shoulder or boss 25, adapted to engage against the outer flat surface of the shoulder 11 in assembly. Formed in the crank 22, opposite to the boss 25, is a circular recess or seat 26, receiving a brake lining disc or ring 27, which is secured within this recess, and does not directly engage the shaft 10. Mounted upon the squared extension 13, and being therefore positively locked upon the shaft for rotation therewith, is a circular generally flat brake disc 28, preferably provided with a circular recess 29 for receiving the outer portion of the brake lining ring 27. A brake drag adjusting nut 30 has screw threaded engagement upon the screw threaded extension 14, and the inner annular surface of the nut 30 is adapted to engage against the outer flat surface of the brake disc 29. The nut 30 is preferably provided with suitable wing extensions 31, to facilitate turning the nut.

Pivotally mounted at 31', upon the outer surface of one of the sides 6, and beneath the crank 22, and spaced radially outwardly from the shaft 10, is a generally circular crank latch 32, having a circular recess 33 formed in its inner surface, for receiving a suitable flat spiral latch return spring 34. This latch spring 34 has axial end extensions 34', one of which is secured in a small opening in the side 6, and the other one of which is secured in a similar opening formed in the outer flat wall of the latch 32. The crank latch 32 includes a radial stop lug 35, and a generally radial curved tapered latch finger 36, adapted to engage against the pin 24, carried by the crank 22. Also mounted upon the same side 6, and arranged near but spaced radially outwardly from the latch 32, is an adjustable latch stop or keeper 37, having a curved keeper finger 37', adapted to engage against the stop lug 35, for limiting the swinging movement of the latch 32. This latch keeper 37 is secured to the side 6 by means of screws 38, or the like, and a slot 39, formed in the outer wall of the keeper permits the keeper to be slidably adjusted transversely of the side 6, for swinging the latch finger 36 out of the path of movement of the pin 24. Arranged between the side 6 and the inner surface of the latch keeper 37, and having frictional spring engagement against the keeper, and held in place by the screws 38, is a suitable flat leaf spring 40. This spring 40 causes the keeper 37 to remain in the selected adjusted position.

Pivotally mounted upon a pin 41 secured within openings in the sides 6, at their ends opposite from the keeper 37, is a line guide or holder 42, which is biased inwardly and adapted to engage against the steel fishing line, not shown in the drawings. A suitable coil spring 43 mounted upon the pin 41, forces the line holder 42 against the fishing line. The spring 42 has ends 44 which engage against the yoke 5, and a loop 45 which engages against the line guide or holder 42. In Figure 2, the line holder or guide 42 is shown in such a position as it would assume against a line wound upon the spool 16.

Rigidly secured to the side 6, opposite from the side carrying the latch 32, and arranged adjacent to the end of the shaft 10 having the lug 12, is a counter or depth indicator 46. This indicator 46 receives the lug 12 within it, and the lug actuates the depth indicator for measuring the length of fishing line let out from the reel. In use, the tubular socket 7, which is adjacent to the keeper 37, receives the fishing pole, not shown in the drawings, while the other socket 7 receives a suitable handle, not shown in the drawings.

The operation of the fishing line reel is as follows:

When it is desired that the crank 22 be free for rotation in either direction, for reeling in or letting out the line, the keeper 37, as viewed in Figure 2, is pushed to the left as far as the slot 39 will permit it to move. This causes the latch 32 to turn counterclockwise, as viewed in Figure 2, and the latch finger 36 swings out of the path of the pin 24. The spring 40 causes the keeper 37 to remain in the adjusted position, until moved by hand.

When it is desired that the reel let out no more line, the keeper 37 is moved to the right, in Figure 2, and the spring 34 causes the latch 32 to follow the keeper. In this position, the latch finger 36 is directly in the path of the pin 24, and when the crank 22 turns counterclockwise in Figure 2, this pin engages against the finger 36 and the crank is locked, to prevent the line from being let out further. The lug 35 is engaging against the keeper finger 37', in this instance. It is now possible however to wind up or reel in the line, and to do this, the crank 22 is turned clockwise, in Figure 2. In each clockwise revolution of the crank 22, the pin 24 will engage the rear curved side of the latch finger 36, and the spring 34 yields to permit the latch finger to swing out of the path of the pin 24.

In order to be able to wind or reel in a line having a heavy pull on it, as just described, the nut 30 must first be tightened sufficiently against the brake disc 28, to create enough friction between the brake lining ring 27 and the crank 22, to prevent the crank from slipping on the shaft 10.

The nut 30 can be adjusted to permit any desired amount of slipping. It may be desired to lock the crank 22 against reeling out line, as before described, but to allow the line to be reeled out slowly, by permitting the shaft 10 to slip within the crank 22. As stated, this slipping is controlled by adjustment of the nut 30. This slipping clutch action, obtainable with the reel embodying my invention, makes it extremely unlikely that the fishing line will be broken by sudden and strong jerks on the line.

As stated before, the counter or indicator 46 measures the length of line reeled out, and is therefore an indicator of the depth of the water being fished in.

To completely disassemble the reel, all that is necessary is to loosen the screw 20, slide the locking dog 21 upwardly in the slot 19, and the entire crank and shaft assembly will lift out. The reel or spool 16 will then drop out of the yoke 5. It can thus be seen that the invention provides a highly simplified fishing line reel construction, which performs all of the functions of much more complicated reels.

It is to be understood, that the form of my invention herewith shown and described, is to be taken as a preferred example of the same, and that various changes in the shape, size and arrangement of parts, may be resorted to, without departing from the spirit of my invention, or the scope of the subjoined claims.

Having thus described my invention, what I claim is:

1. A fishing line reel, comprising a yoke, a shaft journaled within the yoke and having a transverse opening, a spool mounted upon the shaft, a dog slidably mounted upon the spool for insertion within the opening, a shoulder rigidly mounted upon the shaft, a crank having an opening to receive the shaft and engaging the shoulder, a brake disc mounted upon the shaft to turn therewith and move longitudinally thereof, a brake lining ring arranged between the shoulder and brake disc, a nut having screw threaded engagement with the shaft and engaging the brake disc, a pin carried by the crank, a latch pivoted upon the yoke and having an inner extension to coact with the pin and an outer extension, a reciprocatory latch keeper mounted upon the yoke and having an extension to engage with the outer extension, and a spring engaging the keeper for controlling its movements.

2. A fishing line reel comprising a support member, a shaft journalled upon the support member and having a shoulder, a spool mounted upon the shaft for rotation therewith, a crank rotatably mounted upon the shaft and frictionally engaging the shoulder and including a lateral extension, an axially adjustable friction device secured to the shaft for rotation therewith and engaging the crank upon its side remote from the shoulder, a thin flat latch pivotally mounted upon the support member between the member and crank and including inner and outer radial extensions, a torsion spring to resist turning movement of the latch in one direction, a keeper plate slidably adjustably mounted upon the support member and having an integral extension to engage the outer radial extension to prevent the latch from turning in one direction, the lateral extension of the crank engaging the inner radial extension and being stopped by such extension when the crank is turned in one direction, the latch turning against the torsion spring which yields to allow the crank to turn in the opposite direction.

PHILLIP BRIKOFF.

REFERENCES CITED

The following references are of record in the file of this patent:

UNITED STATES PATENTS

| Number | Name | Date |
| --- | --- | --- |
| 1,603,306 | Adams | Oct. 19, 1926 |
| 1,761,750 | Schafer | June 3, 1930 |
| 2,136,438 | Horsrud | Nov. 15, 1938 |

FOREIGN PATENTS

| Number | Country | Date |
| --- | --- | --- |
| 192,594 | Great Britain | Feb. 8, 1923 |